(12) United States Patent
Jan

(10) Patent No.: US 6,854,382 B2
(45) Date of Patent: Feb. 15, 2005

(54) DEVICE FOR EXTRACTING JUICE FROM PLANT

(76) Inventor: Tzuen-Yu Jan, No. 377, Section 1, Situn Road, Taichung City (TW), 404

( * ) Notice: Subject to any disclaimer, the term of this patent is extended or adjusted under 35 U.S.C. 154(b) by 0 days.

(21) Appl. No.: 10/849,893

(22) Filed: May 21, 2004

(65) Prior Publication Data

US 2004/0231529 A1 Nov. 25, 2004

(30) Foreign Application Priority Data

May 22, 2003 (TW) .......................... 092112740
May 22, 2003 (TW) .......................... 092113853

(51) Int. Cl.⁷ .......................... A23N 1/00; A23N 1/02; A47J 43/046; A47J 43/07
(52) U.S. Cl. .......................... 99/510; 99/495; 99/509; 100/117; 100/145
(58) Field of Search .................. 99/348, 495, 509–513; 100/117, 145, 147, 148; 241/37.5, 92, 93, 260.1, 282.1, 169.1; 366/197–199, 205, 306, 318, 601; 210/173, 174; 426/481, 482, 489, 518, 616

(56) References Cited

U.S. PATENT DOCUMENTS

| | | | | |
|---|---|---|---|---|
| 2,109,398 A | * | 2/1938 | McNitt | 100/148 |
| 2,315,028 A | * | 3/1943 | Thomas | 99/513 |
| 2,864,419 A | * | 12/1958 | Woock | 99/513 |
| 4,429,626 A | * | 2/1984 | Ihara et al. | 99/510 |
| 4,440,074 A | * | 4/1984 | Ihara et al. | 99/510 |
| 5,396,836 A | * | 3/1995 | Kim | 99/510 |
| 5,452,650 A | * | 9/1995 | Lee | 99/510 |
| 5,651,305 A | * | 7/1997 | Bushman et al. | 99/510 |
| 5,906,154 A | * | 5/1999 | Yoon et al. | 99/510 |
| 5,970,860 A | * | 10/1999 | Yip | 99/510 |
| 6,425,321 B1 | * | 7/2002 | Yip | 99/510 |
| 6,637,323 B2 | * | 10/2003 | Kim | 99/510 |

* cited by examiner

Primary Examiner—Timothy F. Simone
(74) Attorney, Agent, or Firm—Bacon & Thomas PLLC

(57) ABSTRACT

A device for extracting juice from one of various plants (e.g., grass, soybeans, or wheat) comprises a motor, a hollow container, a spindle in the container and is rotatably coupled to the motor, a strainer surrounded a portion of the spindle and fastened in the container, a cap secured to the other end of the container and including a drum tapered toward the other end, and an adjustment mechanism including a hollow, cylindrical member fixedly coupled to the cap, and a manipulation assembly. The manipulation assembly can either advance into a mouth of the spindle for decreasing a size of a residue outlet formed by the manipulation assembly and the drum or withdraw from the mouth for increasing the size of the residue outlet. Also, juice concentration is adjusted in the sliding movement of the manipulation assembly.

6 Claims, 6 Drawing Sheets

DEVICE FOR EXTRACTING JUICE FROM PLANT

BACKGROUND OF THE INVENTION

1. Field of the Invention

The present invention relates to devices for extracting juice from plant and more particularly to an improved device for extracting juice from one of a variety of plants (e.g., grass, soybeans, wheat, or the like) with concentration adjustment arrangement.

2. Description of the Prior Art

Devices for extracting juice from plants (e.g., grass) are well known. However, the prior devices suffered from several disadvantages as observed by the present inventor. For example, there is no concentration adjustment arrangement therein. Thus, it is only applicable for extracting juice from grass. Further, it is noisy in operation due to strong vibration. Furthermore, juice quality is poor and it has a limited useful life and higher energy consumption. Moreover, residue tends to accumulate on the small openings of strainer (i.e., the openings are partially or even completely blocked) after a short period of time of use. As a result, juice is gradually decreased. Thus, the need for improvement still exists.

SUMMARY OF THE INVENTION

It is an object of the present invention to provide a device for extracting juice from plant comprising motor means; hollow container means having one end coupled to the motor means and including a first bowl, a feed tube disposed on the first bowl and being in communication therewith, a plurality of lengthwise ridges disposed on an internal surface of the first bowl, a second bowl disposed at the other end, and a juice outlet disposed in a bottom of the second bowl; a spindle including an extension projected through the container means into the motor means for rotatably coupling thereto, a screw disposed in the bowls, a tapered section proximate the other end, and a mouth at the other end; a strainer surrounded a portion of the spindle and fastened in the second bowl; a cap secured to the other end of the second bowl and including a drum tapered toward the other end; and an adjustment mechanism including a hollow, cylindrical member fixedly coupled to the cap, and a manipulation assembly; wherein the manipulation assembly is operative to either advance into the mouth for decreasing a size of a residue outlet formed by the manipulation assembly and the drum or withdraw from the mouth for increasing the size of the residue outlet. By utilizing this, a variety of plants (e.g., grass, soybeans, wheat, or the like) can be extracted. Also, it is possible of adjusting juice concentration.

In one aspect of the present invention the manipulation assembly comprises a staged opening on a surface of the hollow, cylindrical member, an adjustment member disposed in the hollow, cylindrical member, a lever having an inner end passed the staged opening to fixedly couple to the adjustment member, and a sliding conic member extended from the protrusion such that either the residue outlet having a small size is formed by advancing the conic member toward the cap by pushing the lever forward along the staged opening or the residue outlet having a large size is formed by withdrawing the conic member from the cap by pulling the lever rearward along the staged opening.

In another aspect of the present invention the strainer comprises a plurality of groups of openings, each opening having a tapered inner end and being in communication with inside and outside of the strainer, a plurality of lengthwise channels each disposed between two adjacent groups of the openings, each channel having a tapered inner end and being in communication with inside and outside of the strainer, and a plurality of lengthwise ribs disposed on an internal surface, each rib being proximate a corresponding channel and having an arcuate surface and a shoulder.

In a further aspect of the present invention the mouth comprises internal threads and the manipulation assembly comprises a cylindrical bar having external threads at one end secured to the internal threads so as to form a residue outlet between the bar and the mouth.

BRIEF DESCRIPTION OF THE DRAWINGS

The drawings disclose an illustrative embodiment of the present invention which serves to exemplify the various advantages and objects hereof, and are as follow.

DETAILED DESCRIPTION OF THE PREFERRED EMBODIMENTS

Figure 1:
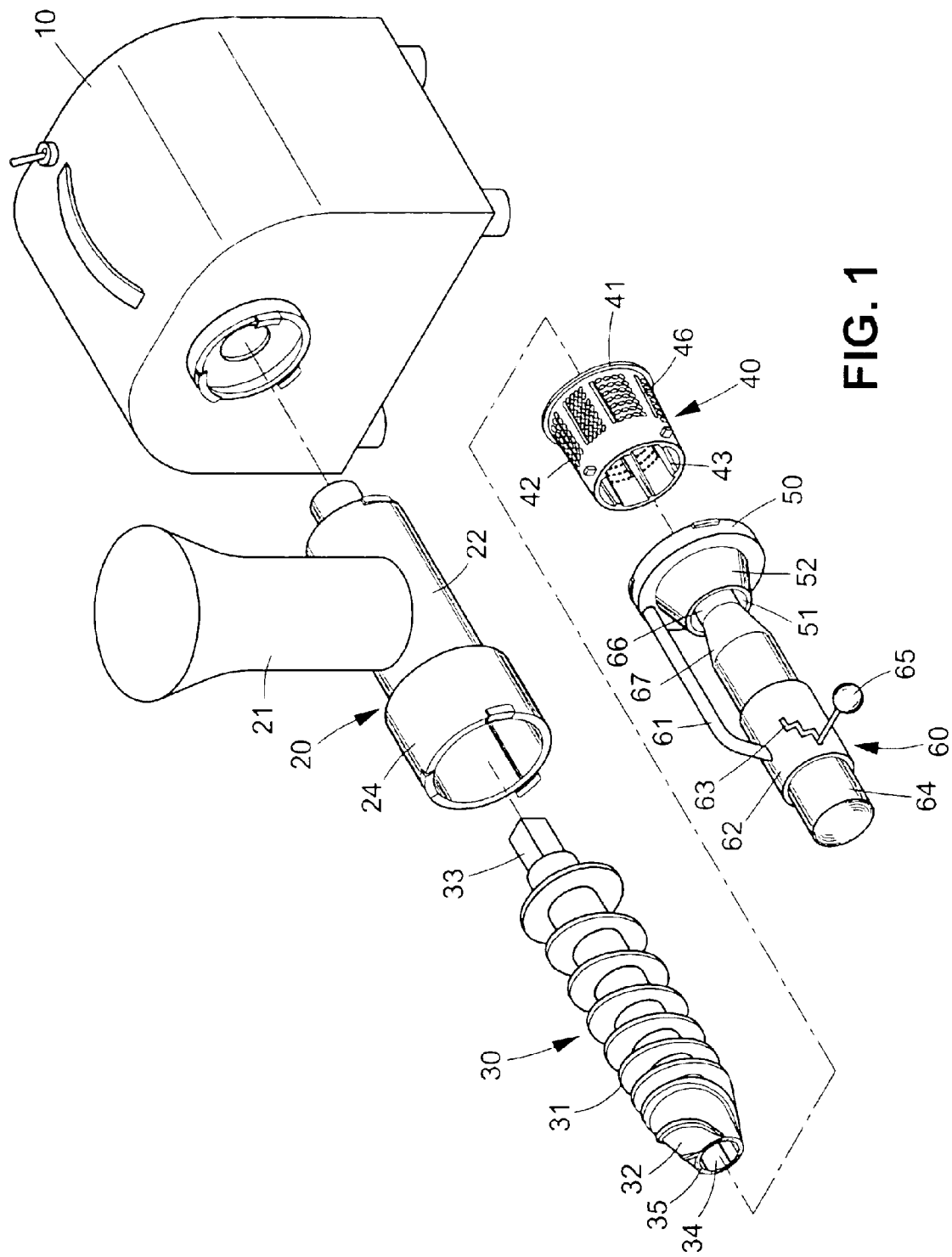
FIG. 1 is an exploded perspective view of a first preferred embodiment of device for extracting juice from plant according to the invention.
Figure 3:
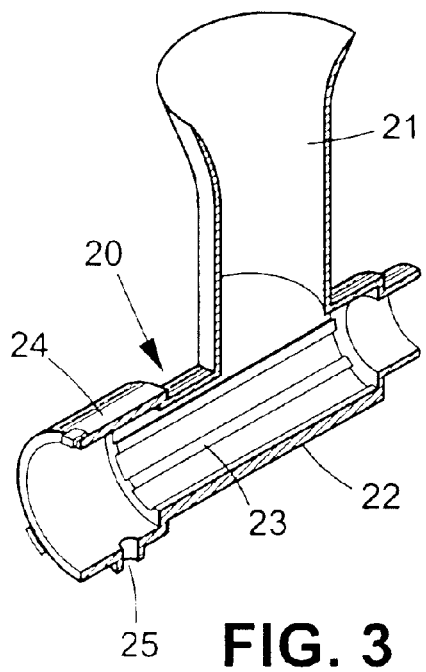
FIG. 3 is a perspective view of the container unit with a half broken away to show interior features.
Figure 2:
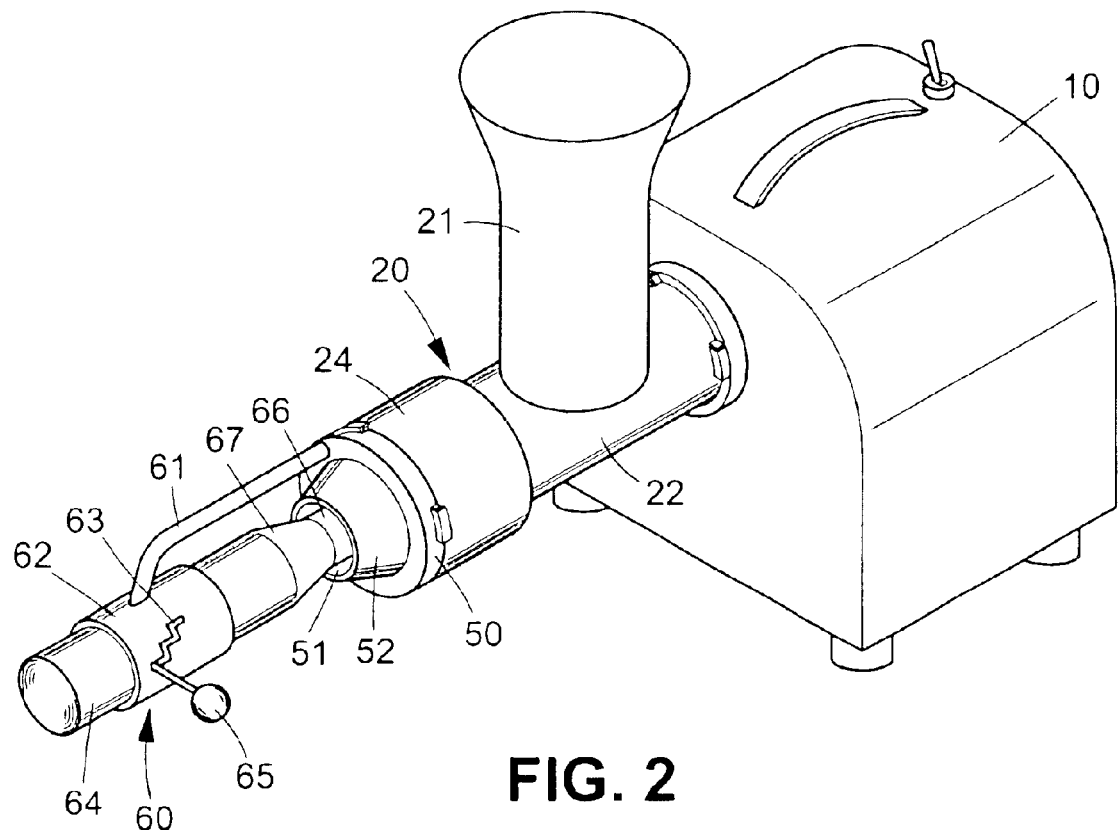
FIG. 2 is a perspective view of the assembled device of FIG. 1.
Figure 4:
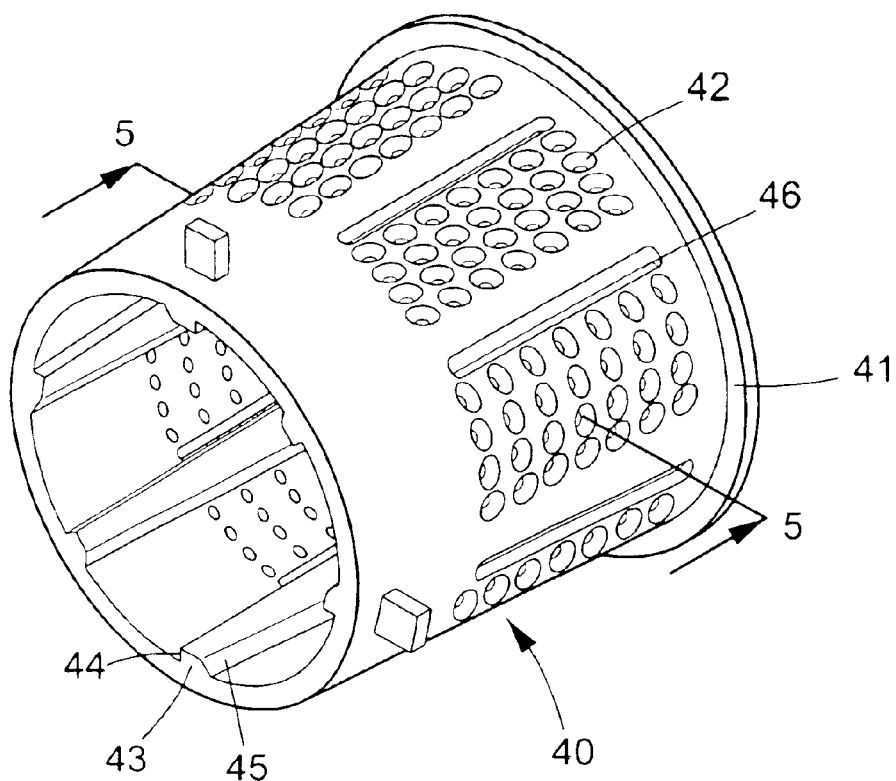
FIG. 4 is a perspective view of the greatly enlarged strainer.
Figure 5:
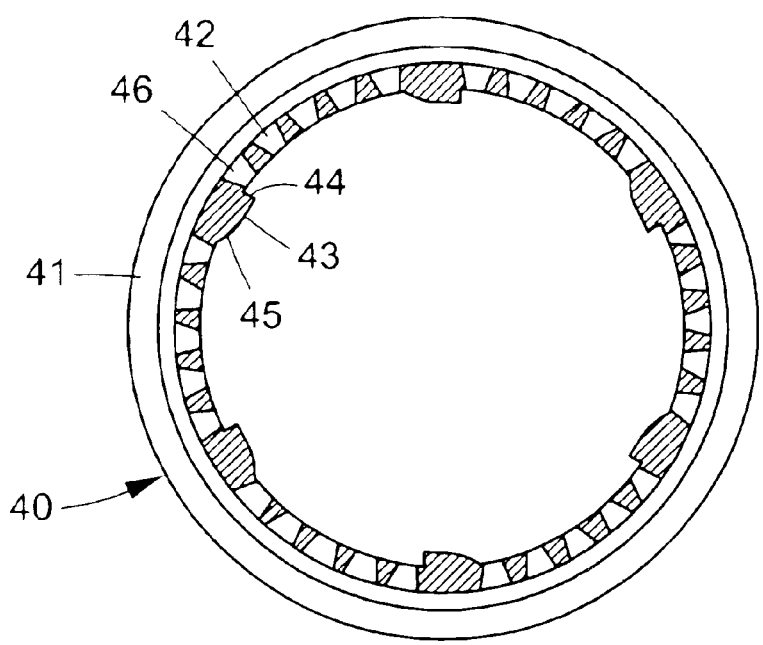
FIG. 5 is a sectional view taken along line 5—5 of FIG. 4.

Referring to FIGS. 1 to 5, there is shown a device for extracting juice from plant constructed in accordance with a first preferred embodiment of the invention. The elongated device comprises a motor unit 10; a hollow container unit 20 including a hollow cylindrical member at one end coupled to a coupling inside the motor unit 10, an intermediate small bowl 22, an upright feed tube 21 in communication with the small bowl 22, a plurality of lengthwise ridges 23 equally spaced around an internal surface of the small bowl 22, a large bowl 24 at the other end, and a juice outlet 25 in a bottom of the large bowl 24; a spindle 30 including an extension 33 having a rectangular section projected from the end member of the container unit 20 into the motor unit 10 for rotatably coupling thereto, a screw 31 disposed in the bowls 22 and 24 in which the pitch of the screw 31 is gradually decreased toward the other end, a tapered section 32 proximate the other end, a mouth 34 at the other end, and a lubricating lining 35 in the mouth 34; a drumlike strainer 40 surrounded a portion of the spindle 30 and including an annular flange 41 at one end secured to a shoulder of the large bowl 24 in a joining portion of the bowls 22 and 24, a plurality of groups of openings 42 on a surface, each opening 42 having a tapered inner end and being in communication with inside and outside of the strainer 40, a plurality of lengthwise channels 46 each disposed between two adjacent groups of the openings 42, each channel 46 also having a tapered inner end and being in communication with inside and outside of the strainer 40, and a plurality of lengthwise ribs 43 equally spaced around an internal surface of the strainer 40, each rib 43 being proximate a corresponding channel 46 and having an arcuate surface 43 and a shoulder 44; a cap 50 secured to the other end of the large bowl 24 and including a drum 52; and an adjustment mechanism 60 including a fixing member 61 fixedly coupled to the cap 50, a protrusion 66 at one end projected into the mouth 34 to form a residue outlet 51, an intermediate sliding conic member 67 extended from the protrusion 66, a hollow, cylindrical member 62 at the other end, a staged opening 63 on a surface of the hollow, cylindrical member 62, an adjustment member 64 partially disposed in the hollow, cylindrical member 62, and a lever 65 having an inner end passed the opening 63 to fixedly couple to the adjustment member 64.

Figure 6:
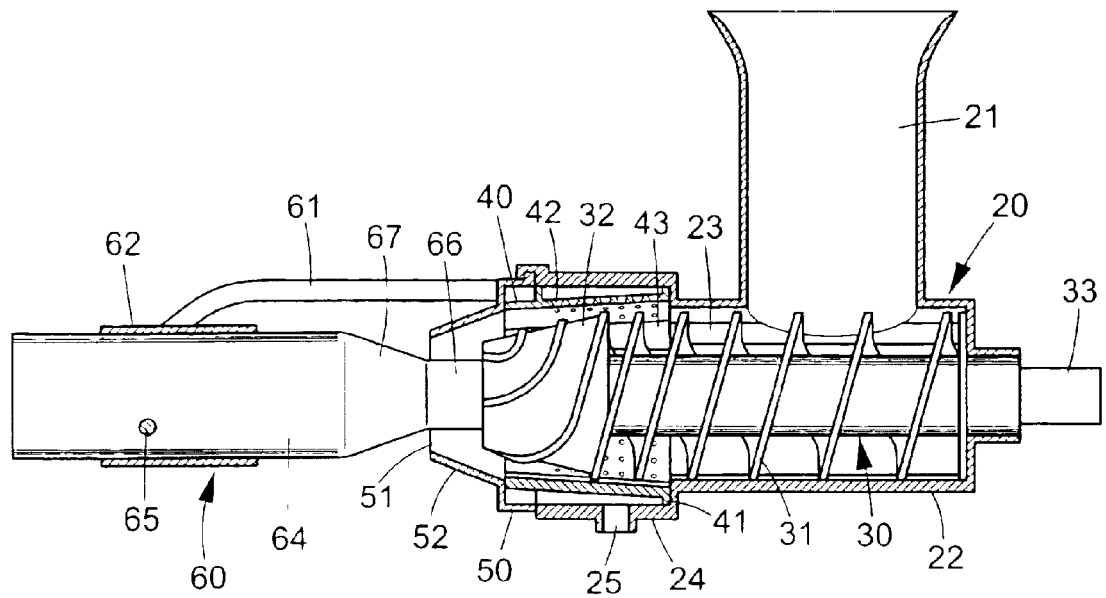
FIGS. 6 and 7 are sectional views of the device in operation, where the residue outlet is adjusted to large and small ones respectively.
Figure 7:
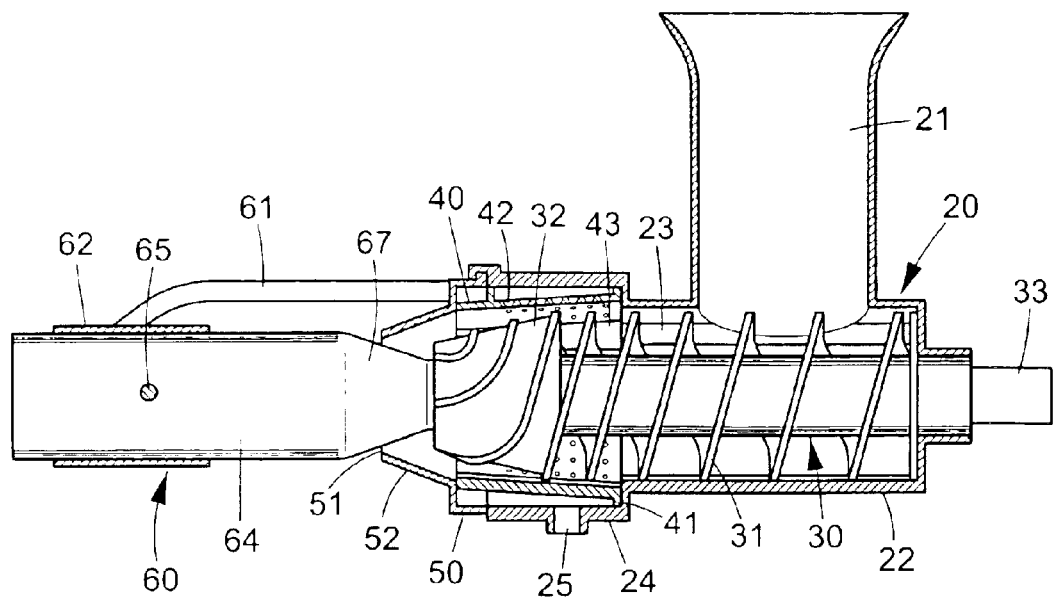

Referring to FIGS. 6 and 7, in operation, material (e.g., grass, soybeans, wheat, or the like) is continuously fed into the feed tube 21. Next, activate the motor unit 10 to rotate the screw 31. The material is then guided into the small bowl 22. Further, material in the small bowl 22 is pressed and forwarded to the larger bowl 24 by the rotating screw 31 which is in proximity with the ridges 23 and ribs 43 but not being interfered therewith. As such, juice is generated and flows to the strainer 40. Juice is able to pass the openings 42 and channels 46 while large residue and large particles are prevented from passing the same due to the configuration of tapered inner ends of the openings 42 and the channels 46. Juice then flows to the external via the juice outlet 25. At the same time, residue is pushed toward the residue outlet 51 after leaving the strainer 40. Eventually, residue exits the residue outlet 51.

For adjusting concentration of juice, a user may push or pull the lever 65 along the staged opening 63. In one position (see FIG. 7), a small residue outlet 51 is formed by advancing the conic member 67 toward the cap 50 by pushing the lever 65 forward. In the position, less residue output per unit time is carried out. That is, juice of high concentration is obtained. To the contrary, a large residue outlet 51 is formed by withdrawing the conic member 67 from the cap 50 by pulling the lever 65 rearward as shown in FIG. 6. In the position, more residue output per unit time is carried out. That is, juice of low concentration is obtained. The first preferred embodiment is particularly suitable for plant having hard tissue such as grass, soybeans, or the like.

Figure 8:
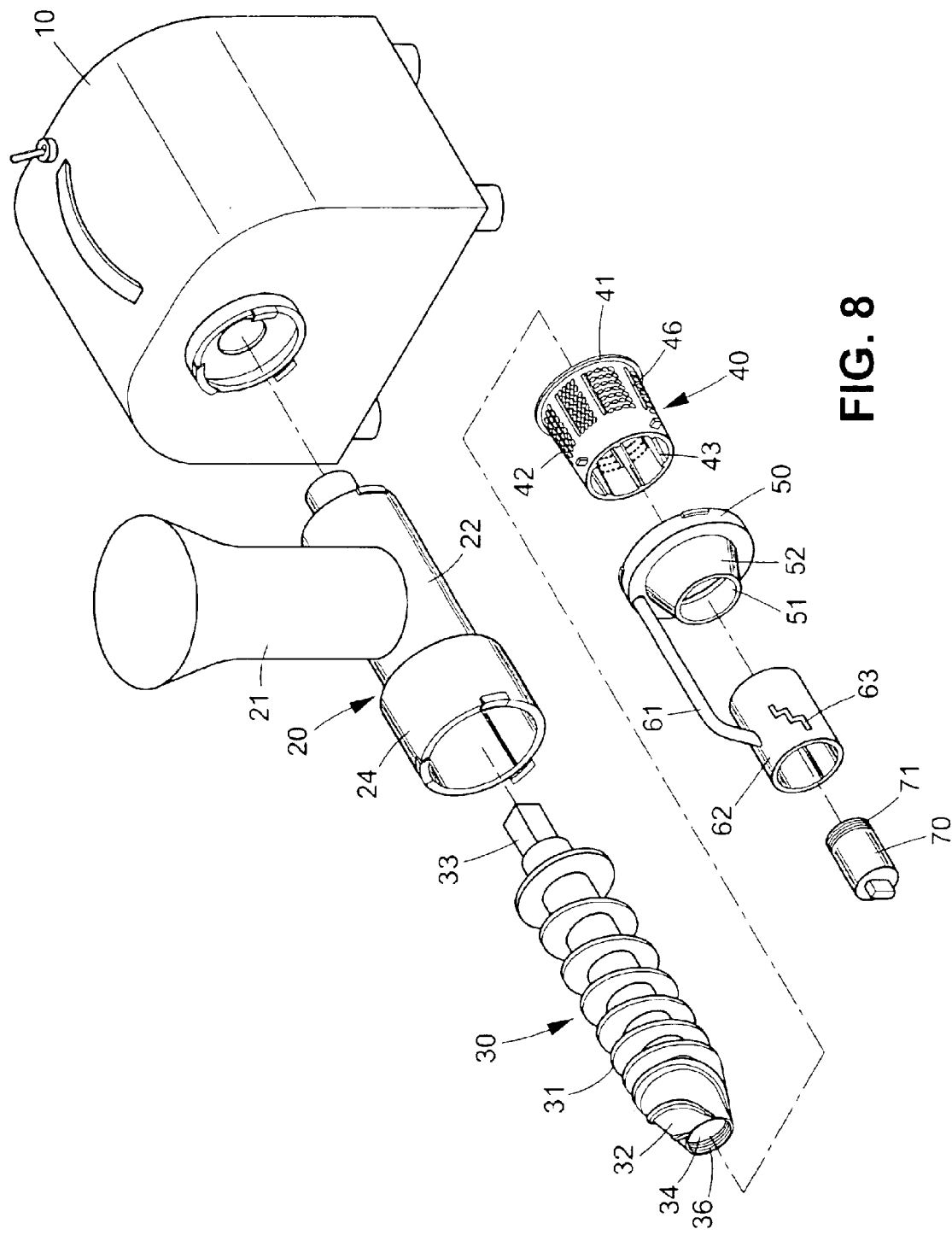
FIG. 8 is an exploded perspective view of a second preferred embodiment of device for extracting juice from plant according to the invention.
Figure 9:
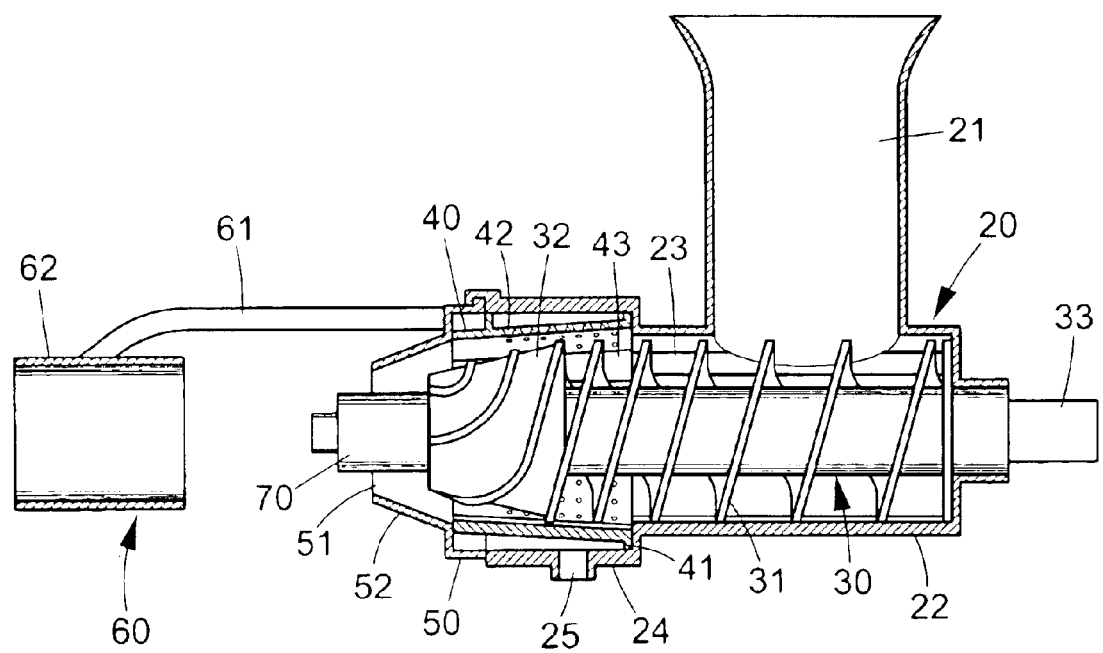
FIG. 9 is a sectional view of the device of FIG. 8 in operation.

Referring to FIGS. 8 and 9, there is shown a second device for extracting juice from plant constructed in accordance with a preferred embodiment of the invention. The second preferred embodiment substantially has same structure as the first preferred embodiment. The differences between the first and the second preferred embodiments, i.e., the characteristics of the second preferred embodiment are detailed below. The lining 35 is replaced by internal threads 36 in the same position. The protrusion 66, the conic member 67, the adjustment member 64, and the lever 65 are replaced by a short cylindrical bar 70 having external threads 71 at one end secured to the internal threads 36 for coupling the bar 70 and the spindle 30 together. The bar 70 in the mouth 34 thus forms a residue outlet 51. The second preferred embodiment is particularly suitable for plant having soft tissue such as wheat leaves or the like.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A device for extracting juice from plant comprising:

motor means;

hollow container means having one end coupled to the motor means and including a first bowl, a feed tube disposed on the first bowl and being in communication therewith, a plurality of lengthwise ridges disposed on an internal surface of the first bowl, a second bowl disposed at another end, and a juice outlet disposed in a bottom of the second bowl;

a spindle including an extension projected through the container means into the motor means for rotatably coupling thereto, a screw disposed in the bowls, a tapered section proximate the other end, and a mouth at the other end;

a strainer surrounded a portion of the spindle and fastened in the second bowl;

a cap secured to the other end of the second bowl and including a drum tapered toward the other end; and an adjustment mechanism including a hollow, cylindrical member fixedly coupled to the cap, and a manipulation assembly;

wherein the manipulation assembly is operative to either advance into the mouth for decreasing a size of a residue outlet formed by the manipulation assembly and the drum or withdraw from the mouth for increasing the size of the residue outlet.

2. The device of claim 1, wherein the manipulation assembly comprises a staged opening on a surface of the hollow, cylindrical member, an adjustment member disposed in the hollow, cylindrical member, a lever having an inner end passed the staged opening to fixedly couple to the adjustment member, and a sliding conic member extended from a protrusion such that either the residue outlet having a small size is formed by advancing the conic member toward the cap by pushing the lever forward along the staged opening or the residue outlet having a large size is formed by withdrawing the conic member from the cap by pulling the lever rearward along the staged opening.

3. The device of claim 1, wherein the strainer comprises a plurality of groups of openings, each opening having a tapered inner end and being in communication with inside and outside of the strainer, a plurality of lengthwise channels each disposed between two adjacent groups of the openings, each channel having a tapered inner end and being in communication with inside and outside of the strainer, and a plurality of lengthwise ribs disposed on an internal surface, each rib being proximate a corresponding channel and having an arcuate surface and a shoulder.

4. The device of claim 1, wherein the mouth comprises a lubricating lining.

5. The device of claim 1, wherein the mouth comprises internal threads.

6. The device of claim 5, wherein the manipulation assembly comprises a cylindrical bar having external threads at one end secured to the internal threads so as to form a residue outlet between the bar and the mouth.

* * * * *